July 13, 1954  E. McHUGH  2,683,511
TORQUE THRUST CONTROL DEVICE
Filed Sept. 28, 1949
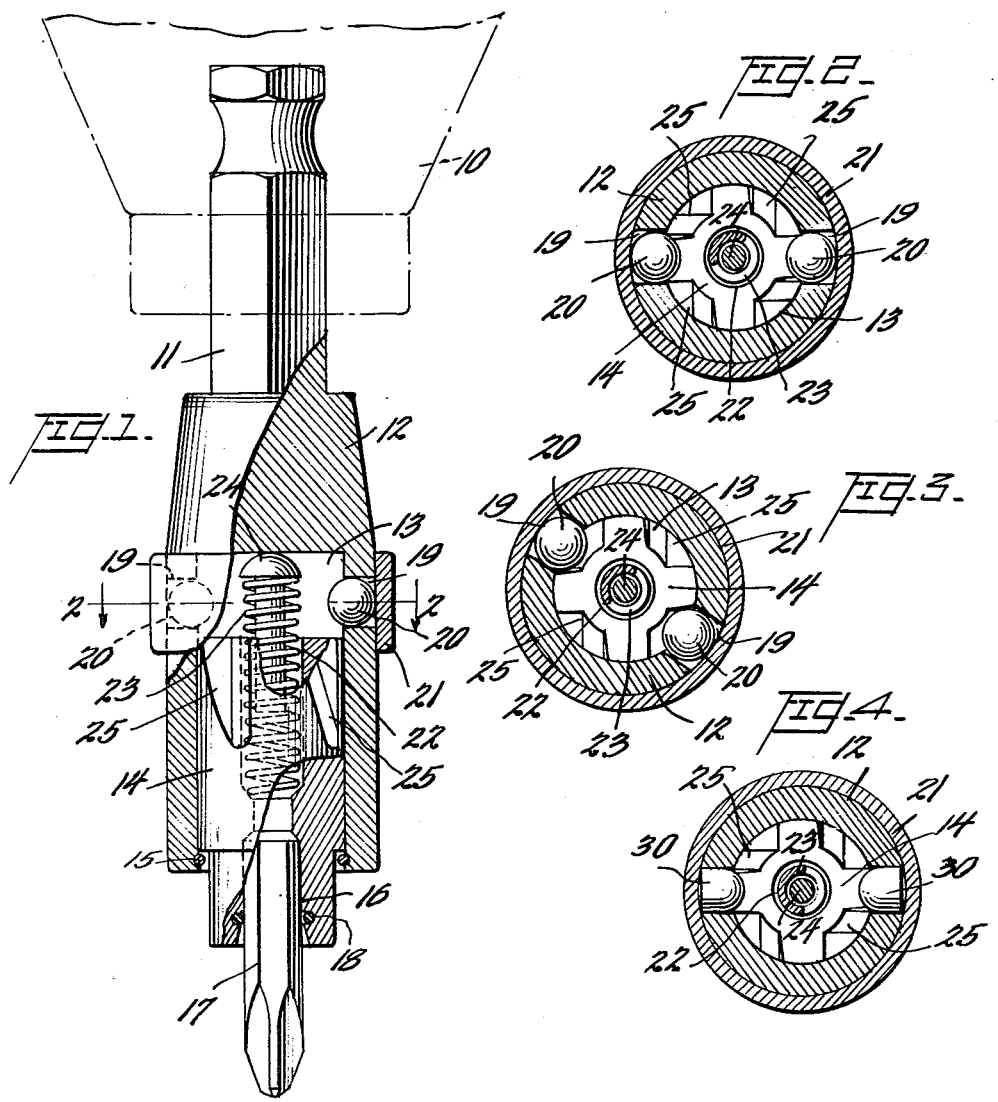
INVENTOR
Edward
McHugh
BY
Watson, Cole, Grindle & Watson
ATTORNEY Patented July 13, 1954

2,683,511

UNITED STATES PATENT OFFICE 2,683,511

TORQUE THRUST CONTROL DEVICE

Edward McHugh, Potsdam, N. Y., assignor to American Screw Company, Providence, R. I., a corporation of Rhode Island Application September 28, 1949, Serial No. 118,364

3 Claims. (Cl. 192—56)

This invention relates to torque-thrust control devices for use in conjunction with rotary tools, either hand or power driven, such as screw drivers, wrenches and the like, and is particularly directed to a device which is distinguished from the torque limiting devices or slip clutches in general use in that its primary purpose is not to limit the value of the torque which may be applied, but rather to insure that a predetermined minimum end thrust is maintained on the tool so long as any torque is transmitted.

One example of the utility and value of a device of this character lies in its application to screw drivers. It is customary, in manufacturing operations involving the driving and setting of screws, to employ torque limiting devices for the purpose of preventing the application of excessive torque to the screws, with resulting damage to the work. Such devices are customarily in the form of a power transmitting clutch between the power source and the work-engaging bit, such clutch being adapted to disengage automatically when a predetermined value of torque is reached. Such devices are of value for obvious reasons, and the present invention is not intended as a substitute for such torque limiting devices, but rather as a supplement thereto.

For example, in the case of a screw driver equipped with a torque limiting clutch, if for any reason the operator, during the driving of a screw, reduces the end thrust applied to the tool before the predetermined torque limit is reached, the work-engaging bit will continue to rotate even though the end thrust is reduced below the value necessary to keep the bit in proper work engagement. As a result, the kerf or recess in the screw head may be reamed, marred or even completely destroyed. Even if the kerf or recess in the screw head is not seriously damaged, the relative rotation between the driver bit and the screw causes wear upon the former, and since such wear is cumulative as the driver is used with a large number of screws, the driver may soon become worn beyond usefulness and have to be discarded.

The tendency for a tool or bit to disengage enough to slip and thus cause excessive bit wear, or mar or damage the kerf or recess, increases with increased torque. It is thus necessary to maintain much more axial force to "hold in" a bit or driver transmitting 100 inch pounds of torque than one transmitting 10 inch pounds of torque. It is thus apparent that required axial force is a function of driving torque. The device of the present invention insures that the proper ratio of axial force to torque is maintained. If it is not maintained the bit or driver will cease to turn or transmit torque (the clutch will disengage) and thus prevent damage to the bit, the screw or the work.

It is the general object of the present invention to provide a device for use with rotary tools of the character described, comprising a torque transmitting clutch so designed that no torque can be transmitted unless a minimum required end thrust is maintained on the tool, such minimum thrust being that required to maintain proper engagement between the tool bit and the work.

More specifically, it is an object of the invention to provide a torque-thrust control device comprising a driving member, a driven member, means for securing a tool to the driven member, and clutch means acting between said driving and driven members to transmit torque, such clutch means being adapted to disengage whenever the end thrust applied to the tool is reduced below a predetermined minimum, so that no torque may be transmitted unless the tool bit is in proper engagement with the work.

A further object is the provision of a device of the character described in which the clutch means consists of one or more bevelled surfaces on the driving or driven member, and one or more cooperating parts on the other member for engaging said bevelled surfaces, the bevels being such as to cause automatic disengagement of the clutch whenever the end thrust is reduced below a predetermined minimum.

Other and further objects, features and advantages will be apparent from the description which follows, read in connection with the accompanying drawings in which Figure 1 is a side elevation, partly in section, illustrating a device, according to the invention, employed in connection with a power screw driver;

Figure 2 is a horizontal section on line 2—2 of Figure 1;

Figure 3 is a view similar to Figure 2, but showing the clutch parts in torque-transmitting relation; and Figure 4 is a view similar to Figure 2 illustrating a modification.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring now to Figures 1 and 2, the numeral 10 designates the working end of a power tool adapted for operating screw drivers, wrenches and the like and provided with a hollow spindle into which the shank 11 of the torque control device may be rotatably engaged. The shank 11 may be integral with or rigidly attached to a socket 12 housing the clutch elements to be described. The socket 12 is formed with a cylindrical bore 13 in which is slidably and rotatably mounted a hollow spindle 14, which may be retained within the socket 12 by means of a snap-ring 15. The spindle 14 is provided with a noncircular recess or bore 16 to receive a driver bit 17 or other tool of complementary shape, which may also be retained by means of a snap-ring 18. In the illustrated embodiment the bit 17 is shown as adapted for driving screws of the "Phillips" recessed-head type, but the invention is applicable to numerous other tools of the general character mentioned above.

The socket 12 is provided with a plurality of lateral bores 19 adapted to receive balls 20, the sides of the bores 19 being tapered inwardly so that the balls 20 cannot escape into the interior of the socket. The balls 20 are retained in place by means of a collar 21 which has a press fit on the socket 12.

The spindle 14 is provided with a central axial bore 22 for the accommodation of a helical spring 23, the upper end of which surrounds a guide in the form of a stud 24 abutting the closed end of the bore 13 within the socket 12. The spring 23 being under compression, normally maintains the spindle 14 in its lower or extended position and the clutch disengaged, but the pressure or weight of the spring 23 may be only sufficient to maintain this condition when no end thrust is applied to the tool. In other words, the weight of the spring is not related to the torque to be applied, and the device as a whole is not an automatic torque limiting device.

The spindle 14 is provided at its upper end with a plurality of axially extending slots 25 of sufficient width to receive the balls 20, the forward or driven walls of the slots 25 being bevelled or inclined longitudinally of the spindle, the angle of incline being related to the desired end thrust. In other words, when the tool is in use, the clutch will remain engaged so long as the necessary end thrust is maintained in order to keep the bit properly seated in the work, but if the thrust should for any reason be reduced below that value determined by the designed thrust-torque ratio, the balls 20 will ride up the inclined walls of the slots 25 and disengage the clutch. If all end thrust is removed, this action will occur and the spring 23 will maintain the clutch in disengaged position so long as no end thrust is applied.

As mentioned above, the described device is preferably used in conjunction with a torque limiting clutch of known type, in order that excessive torque may not be applied to the work, causing destruction of the screw, for example, by turning off its head or rupturing the shank, or destruction of the work by reaming the screw hole. As explained, it is additionally necessary, in order to prevent damage to the screw slot or recess, and excessive wear on the driver bit, to remove all torque before the end thrust applied to the tool becomes less than that necessary to maintain the bit properly seated. This latter result is automatically achieved by the device of the present invention.

The inclination or degree of bevel of the driving surface or surfaces may be varied according to the desired minimum end thrust necessary for maintaining torque-transmitting engagement between the clutch parts, which value is in turn dependent upon the nature and purpose of the tool being driven. The ratio of end thrust to torque can thus be made to vary between zero and infinity by changing the angle of the torque transmitting surfaces.

The torque-thrust control device may be employed in connection with power tools, as shown, being built into the tool or used as an auxiliary between the spindle of the tool and the bit. It may be used in a similar manner either with ordinary manual tools, such as hand screw drivers, or with tools of the brace and bit type.

Having thus described the invention, what is claimed as new and desired to be secured by Letters Patent is:

1. A torque-thrust control device for rotary tools comprising a driving member, a driven member, means for securing a tool to said driven member, and torque-thrust ratio-controlled means for establishing releasable torque-transmitting engagement between said driving and driven members by axial movement of one of said members, said torque-thrust ratio-controlled means comprising a radial surface rotatably associated with one of said members and bevelled axially in accordance with the desired minimum thrust required to establish torque-transmitting engagement, a part rotatably associated with said other member and comprising a spherical portion adapted to engage said bevelled surface by relative axial movement, and means normally urging said members out of torque-transmitting engagement.

2. A torque-thrust control device for rotary tools comprising a driving member, a driven member, means for securing a tool to said driven member, and torque-thrust ratio-controlled means for establishing releasable torque-transmitting engagement between said driving and driven members by axial movement of one of said members, said last means comprising a plurality of circumferentially-spaced, radially and longitudinally extending slots in one of said members, one longitudinal wall of each said slot being bevelled, a corresponding number of circumferentially spaced parts associated with said other member and comprising spherical portions adapted to enter said slots when the desired thrust is applied to said device, and means normally urging said members out of torque-transmitting engagement.

3. A device according to claim 2, said circumferentially spaced parts consisting in balls.

References Cited in the file of this patent
UNITED STATES PATENTS

| Number | Name | Date |
|---|---|---|
| 1,169,193 | Ramelli | Jan. 25, 1916 |
| 1,434,970 | Taylor | Nov. 7, 1922 |
| 1,528,584 | Stumpf | Mar. 3, 1925 |
| 1,684,633 | Levedahl | Sept. 18, 1928 |
| 2,379,992 | Sasgen | July 10, 1945 |